US007466890B2

(12) United States Patent
Kachmar

(10) Patent No.: US 7,466,890 B2
(45) Date of Patent: Dec. 16, 2008

(54) CABINET ACCESS SENSOR

(75) Inventor: Wayne M. Kachmar, North Bennington, VT (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 11/521,579

(22) Filed: Sep. 13, 2006

(65) Prior Publication Data

US 2008/0063338 A1 Mar. 13, 2008

(51) Int. Cl.
*G02B 6/00* (2006.01)

(52) U.S. Cl. ......................... 385/134; 385/135; 385/18; 385/19; 385/16; 385/17; 340/500; 340/426

(58) Field of Classification Search ................. 335/205; 350/96.2; 340/426, 500; 385/134–135, 18–20, 385/16–17, 6
See application file for complete search history.

(56) References Cited

U.S. PATENT DOCUMENTS 4,596,442 A * 6/1986 Anderson et al. ............. 385/18
5,680,095 A * 10/1997 Nassouri ................ 340/426.28
5,877,664 A * 3/1999 Jackson, Jr. ................. 335/205
6,091,868 A * 7/2000 Tartarilla et al. .............. 385/19
2006/0071770 A1* 4/2006 Giotti et al. ................. 340/500

* cited by examiner

*Primary Examiner*—Brian Healy
*Assistant Examiner*—Guy G Anderson
(74) *Attorney, Agent, or Firm*—Merchant & Gould P.C.

(57) ABSTRACT

A cabinet tamper detection device is disclosed. The tamper detection device includes a first portion and a second portion. The first portion includes a housing and a first magnet movable relative to the housing between a first position and a second position. The second portion includes a second magnet. The first and the second magnets are configured such that the second magnet applies a magnetic force on the first magnet to keep the first magnet at the first position when the first and the second magnets are at a predetermined relative position. When at least one of the first and the second magnets is moved from the predetermined relative position, the first magnet moves from the first position to the second position to trigger a tamper warning.

15 Claims, 3 Drawing Sheets

CABINET ACCESS SENSOR

FIELD

The present invention relates to prevention of tampering with telecommunications cabinets. More specifically, the present invention relates to a telecommunications cabinet tamper detection and warning device.

BACKGROUND

Outside plant (OSP) telecommunications equipment, including terminations and splitters, may be housed in above-ground, outdoor, protective enclosures such as cabinets.

As demand for telecommunications services increases, optical fiber services are being extended into more and more areas. Often, it is more cost effective to provide for greater service capacity than current demand warrants. This allows a telecommunications service provider to quickly and cost-effectively respond to future growth in demand. Often, telecommunications cabinets are set-up and optical fiber cables are extended to a customer's premises prior to that customer actually requesting or needing service. Such cables may be extended to premises adjacent the premises of a current customer, as it may be cost effective to extend both cables at the same time, or the cables may be extended to new building sites in anticipation of the new occupants of those sites requesting fiber optic service. This creates an easily scalable solution that can provide for high density of connections and aid in connection of new customers to existing connections, expanding fiber optic connectivity on demand.

However, as telecommunications equipment and solutions are simplified and improved in facilitating the expansion of fiber optic connectivity, so is the ease in which unauthorized access can be had to fiber optic connectivity. For example, in the case of an above-ground telecommunications storage cabinet, it is desirable that the equipment be readily accessible as needed by the service technician. However, unauthorized non-customers are finding ways to tamper with such telecommunications equipment to unlawfully gain access to fiber optic connectivity.

SUMMARY

The present invention relates generally to the prevention of tampering with telecommunications cabinets.

In one particular aspect, the present invention relates to a cabinet tamper detection and warning device.

In another particular aspect, the present invention relates to a tamper detection device including a first portion and a second portion. The first portion includes a housing and a first magnet movable relative to the housing between a first position and a second position. The second portion includes a second magnet. The first and the second magnets are configured such that the second magnet applies a magnetic force on the first magnet to keep the first magnet at the first position when the first and the second magnets are at a predetermined relative position. When at least one of the first and the second magnets is moved from the predetermined relative position, the first magnet moves from the first position to the second position to interrupt a signal.

A variety of additional inventive aspects will be set forth in the description that follows. The inventive aspects can relate to individual features and combinations of features. It is to be understood that both the foregoing general description and the following detailed description are exemplary and explanatory only and are not restrictive of the broad inventive concepts upon which the embodiments disclosed herein are based.

DETAILED DESCRIPTION

Reference will now be made in detail to examples of inventive aspects of the present disclosure which are illustrated in the accompanying drawings. Wherever possible, the same reference numbers will be used throughout the drawings to refer to the same or like parts.

Figure 1:
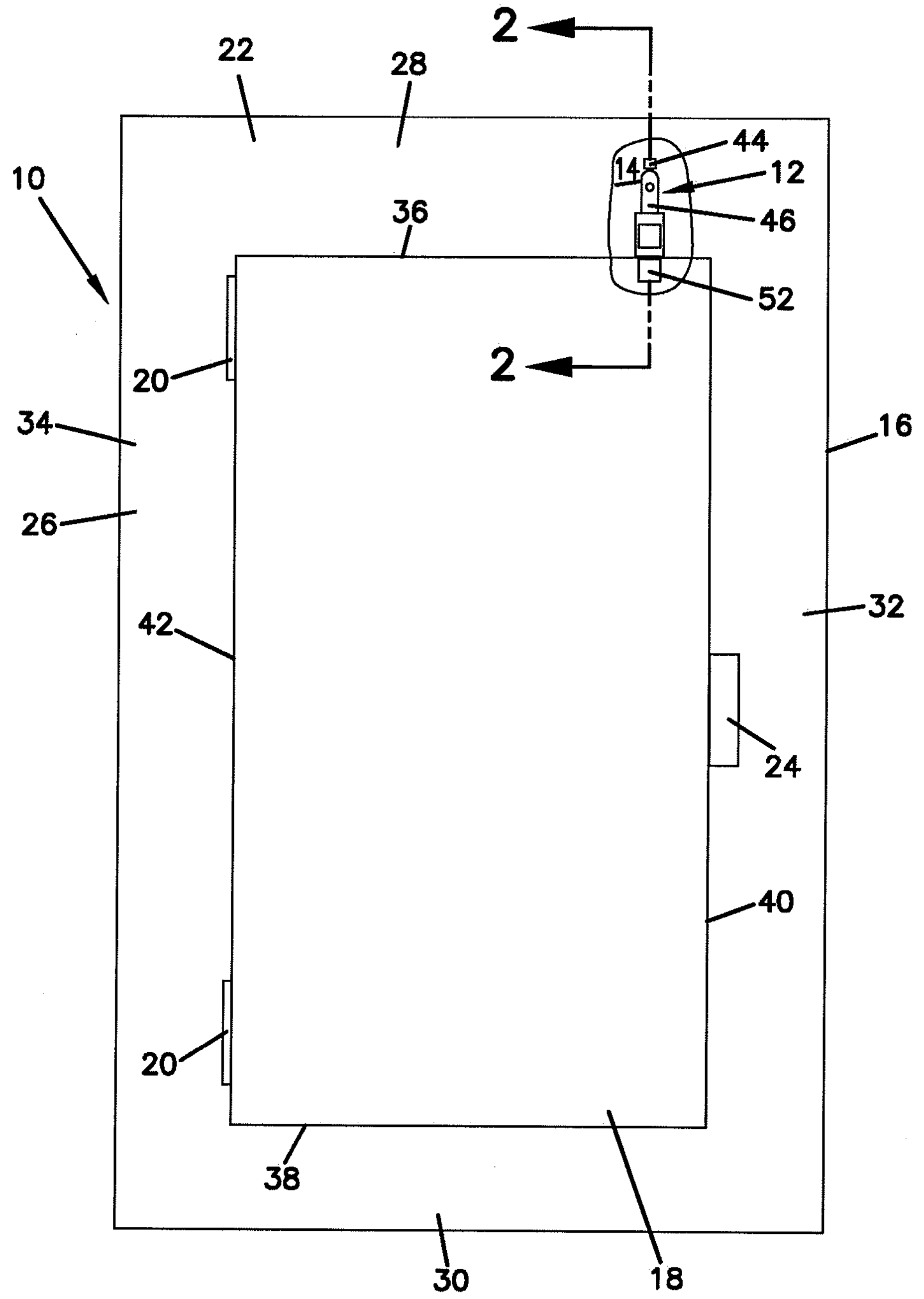
FIG. 1 diagrammatically illustrates a telecommunications cabinet with a tamper detection device having features that are examples of inventive aspects in accordance with the principles of the present disclosure mounted thereon, portions of the telecommunications cabinet have been broken-away to illustrate the tamper detection device within the interior of the cabinet.

Referring to FIG. 1, a telecommunications cabinet 10 including a tamper detection device 12 having features that are examples of inventive aspects in accordance with the principles of the present disclosure mounted thereon is illustrated diagrammatically. As shown in FIG. 1, portions of the wall of the telecommunications cabinet 10 are broken-away to illustrate the tamper detection device 12 within an interior 14 of the cabinet 10.

Figure 3:
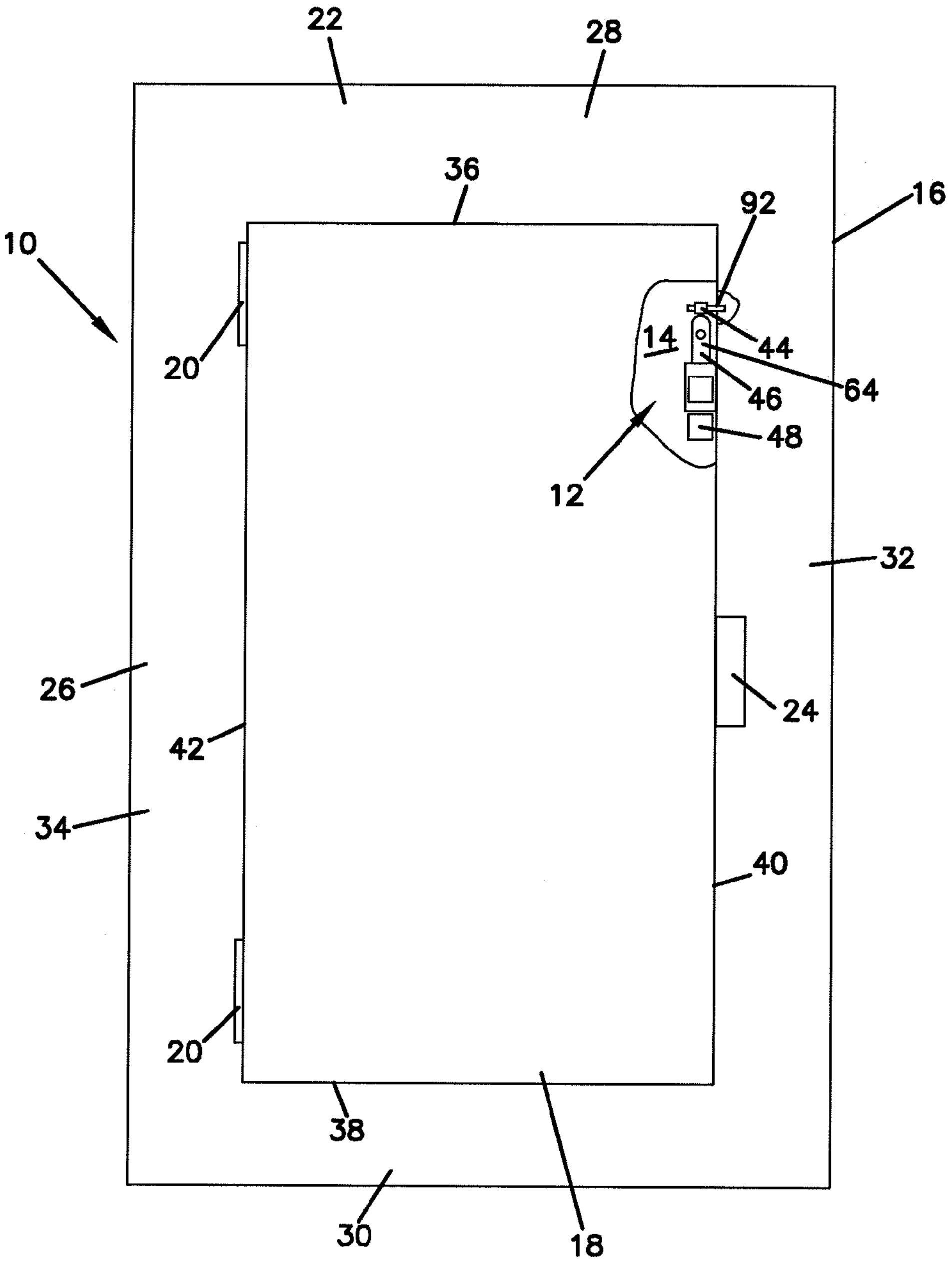
FIG. 3 diagrammatically illustrates the telecommunications cabinet of FIG. 1 with the tamper detection device of FIG. 1 mounted thereon at an alternative mounting location, the telecommunications cabinet including break-away portions to illustrate the tamper detection device within the interior of the cabinet.

Although the cabinet 10 illustrated in FIGS. 1 and 3 and described in the present application is referred to as a "telecommunications cabinet", it should be noted that any type of a cabinet that includes a door or another type of an access panel that opens and closes to provide access to the interior of the cabinet, whether it be a fiber optic telecommunications cabinet, a copper telecommunications cabinet, or a non-telecommunications cabinet, may include the tamper detection device 12 having features that are examples of inventive aspects in accordance with the principles of the present disclosure.

It will be understood that the tamper detection device 12 of the present disclosure is not limited to use with a telecommunications cabinet such as the cabinet 10 illustrated in the figures but that a telecommunications cabinet is simply representative of a type of cabinet that is prone to tampering and will be used to describe the inventive aspects of the tamper detection device 12. Telecommunications cabinets can take a variety of forms, as well known in the art and as, for example, illustrated in U.S. Pat. Nos. 5,497,444, 5,717,810 and 5,758,003, all of which are incorporated herein by reference in their entirety.

Referring to FIG. 1, the telecommunications cabinet 10, shown diagrammatically, includes a housing 16. The housing 16 includes a door 18 (i.e., access panel) that provides access to equipment that may be within the interior 14 of the telecommunications cabinet 10. The door 18, as depicted, is coupled to the housing 16 with hinges 20 and pivots with respect to a front face 22 of the housing 16 to move between an open position and a closed position. The door 18 includes a handle 24 to facilitate opening and closing. In certain embodiments, the door 18 may include a lock for locking the door 18 with respect to the housing 16 to prevent unauthorized entry into the interior 14 of the cabinet 10.

The door 18 covers an access opening defined by the front face 22 of the housing 16. The access opening (covered by the door 18 and not illustrated in the figures) is surrounded by a frame portion 26 defined by the front face 22 of the housing 16. The frame portion 26, as depicted, is generally rectangular and includes an upper frame portion 28, a lower frame portion 30, a right frame portion 32, and a left frame portion 34. The door 18, as depicted, is also generally rectangular and includes an upper end 36, a lower end 38, a right end 40, and a left end 42.

It should be noted that the housing, the door, the access opening, and the frame portion surrounding the access opening are not limited to the shapes and configurations shown, but may take on a variety of different configurations in the art.

Figure 2:
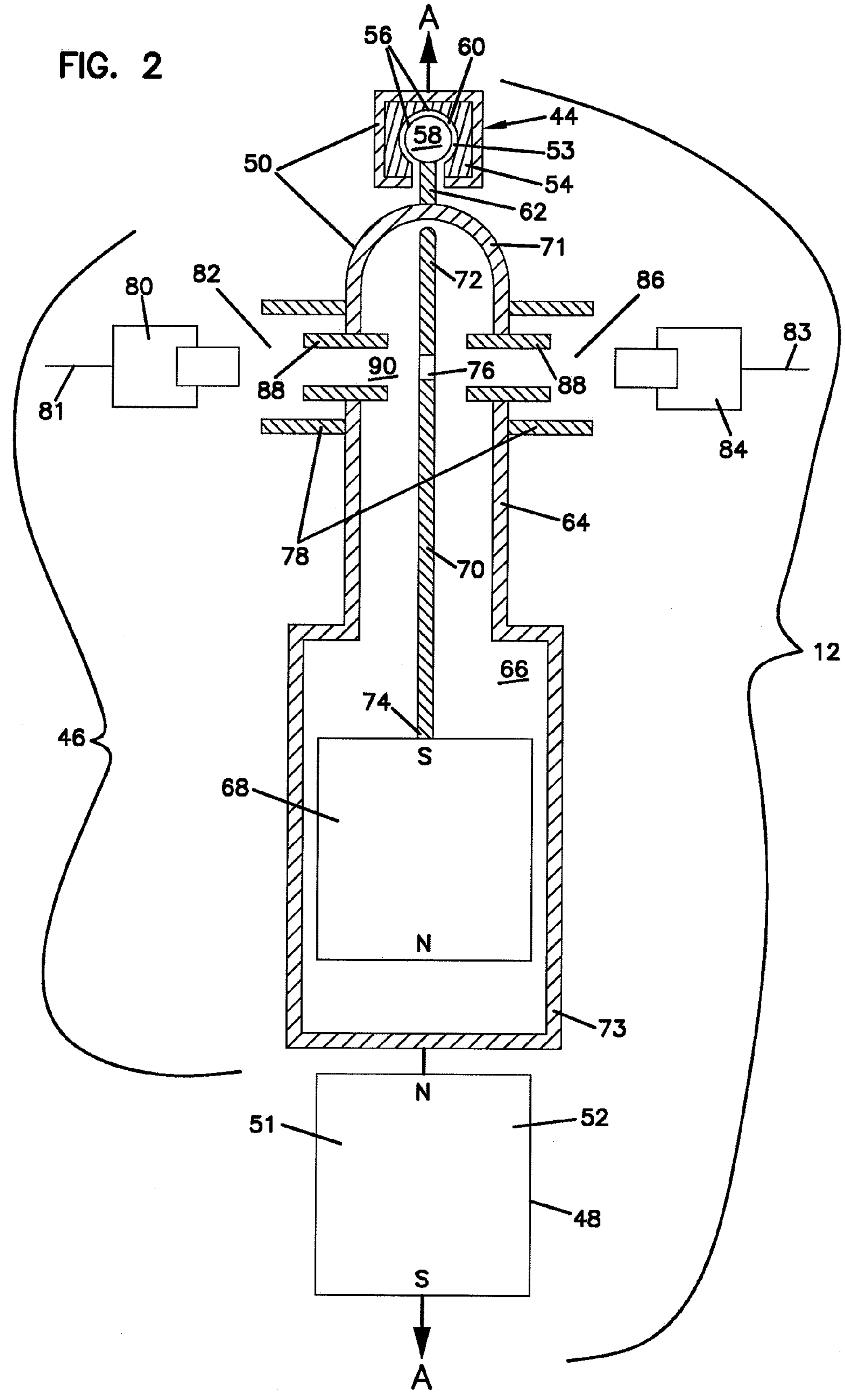
FIG. 2 illustrates a close-up, cross-sectional view of the tamper detection device of FIG. 1 taken along line 2-2 of FIG. 1, the tamper detection device shown diagrammatically.

Referring now to FIG. 2, the tamper detection device 12 having features that are examples of inventive aspects in accordance with the principles of the present disclosure is shown in greater detail. FIG. 2 illustrates a close-up, cross-sectional view of the tamper detection device 12 of FIG. 1 taken along line 2-2 of FIG. 1. The tamper detection device 12 is shown diagrammatically in FIG. 2.

The tamper detection device 12 includes three separate device portions. The tamper device 12 includes a first upper device portion 44, a second middle device portion 46, and a third lower device portion 48. The first and the second device portions 44, 46 of the tamper detection device 12 may be collectively referred to as the cabinet device portion 50 and the third device portion 48 may be referred to as the door device portion 51 of the tamper detection device 12. As will be described in further detail below, the upper device portion 44 of the tamper detection device 12 is adapted to be coupled either directly or indirectly to the frame portion 26 of the cabinet housing 16. The middle device portion 46 is coupled to the upper device portion 44. The lower device portion 48 is adapted to be coupled to the door 18 of the cabinet 10 and is adapted to move with the door 18 of the cabinet 10.

Still referring to FIG. 2, the lower device portion 48 of the tamper detection device 12 includes a first magnet 52. As discussed above, the first magnet 52 is adapted to be mounted to the door 18 of the cabinet 10 and move with the door 18 of the cabinet 10.

The upper device portion 44 of the tamper detection device 12 may be mounted directly or indirectly (such as with brackets, rods, etc.) to the frame portion 26 of the cabinet housing 16. The middle device portion 46 is coupled to the upper device portion 44 via a pivot connection 53. The pivot connection 53 may include a gimbal mount 54 that allows the middle device portion 46 to be suspended freely from the upper device portion 44. Other types of mounting configurations allowing the middle device portion 46 to be freely suspended from the upper device portion 44 are certainly possible.

As shown in FIG. 2, the pivot connection 53 (e.g., gimbal mount connection) between the upper device portion 44 and the middle device portion 46 may be provided with a ball/socket type joint 56 (e.g., a universal joint), allowing the middle device portion 46 to be able to pivot and swing freely in a 360 degree orientation with respect to the upper device portion 44. The pivot connection 53 between the upper device portion 44 and the middle device portion 46, as depicted, may be made with a ball 58 that slides within a C-shaped socket 60. A linkage 62 extending from the ball 58 is coupled to a device housing 64 of the middle device portion 46.

Still referring to FIG. 2, the device housing 64 of the middle device portion 46 defines a hollow interior 66 and a longitudinal axis A. The middle device portion 46 may be sealed to prevent contamination. Housed within the device housing 64 is a second magnet 68. The second magnet 68 is movable within the hollow interior 66 of the device housing 64 and is configured to be in a floating orientation within the interior 66 of the device housing 64. The second magnet 68 is adapted to move up and down generally along the longitudinal axis A. As shown in FIG. 2, the second magnet 68 is provided with an opposed polarity to that of the first magnet 52 of the tamper detecting device 12. The two magnets 52, 68 are configured to repel each other when brought adjacent to each other.

Coupled to the floating second magnet 68 is a gate structure 70. The gate structure 70 extends generally along the longitudinal axis A within the interior 66 of the device housing 64. The gate structure includes an upper gate end 72 and a lower gate end 74. The second magnet 68 is fixedly coupled to the gate structure 70 at its lower gate end 74. The gate structure 70 is adapted to move with the floating magnet 68 and slides axially up and down within the interior 66 of the device housing 64 generally along the longitudinal axis A of the device housing 64. The gate structure 70 includes an opening 76 adjacent its upper end 72, the purpose of which is discussed in further detail below.

The device housing 64 defines an adapter 78 adjacent an upper end 71 of the device housing 64. The adapter 78 is configured to receive a first connector 80 at a first adapter end 82 and a second connector 84 at a second adapter end 86 wherein the first and the second connectors 80, 84 are configured to interconnect or align with each other thru the adapter 78. In the depicted embodiment, the first and the second connectors 80, 84 are fiber optic connectors. Each end 82, 86 of the adapter 78 includes an alignment structure 88 such as an alignment sleeve for axially aligning the first and the second connectors 80, 84 to establish a proper fiber optic connection between the two connectors. A throughhole 90 of the adapter 78 allows a fiber optic signal to pass between the two connectors 80, 84.

Still referring to FIG. 2, according to one embodiment, the first connector 80 is terminated to a first fiber optic cable 81 that leads to a central office location and the second connector 84 is terminated to a second fiber optic cable 83 that leads to the same central office location. The first and the second fiber optic cables 81, 83 carry the same signal such that when the first and the second connectors 80, 84 are interconnected, they form a closed-loop connection with the central office location. The tamper detection device 12 is configured such that if there is an interruption in the closed-loop connection, an alarm is activated, indicating tamper with the telecommunications cabinet 10.

In another embodiment, a plurality of cabinets 10 that have a plurality of tamper detection devices 12 mounted thereon can be daisy-chained together via the use of an optical time domain reflectometer (OTDR). An OTDR is an optoelectronic instrument that injects a series of optical pulses into the fiber under test. An OTDR extracts, from the same end of the fiber, light that is scattered back and reflected back from points in the fiber where the index of refraction changes (e.g., where there is an interruption in the signal carried by the interconnected connectors 80, 84). An OTDR works similar to an electronic time domain reflector (TDR) wherein the TDR measures reflections caused by changes in impedance of the cable under test. The intensity of the return optical pulses is measured and integrated as a function of time, and is plotted as a function of fiber length. In this manner, the interruption location, thus, the location of the specific cabinet 10 that is tampered with in the daisy-chain, can be determined.

A conventional OTDR is used for purposes such as estimating the fiber's length and overall attenuation, including splices and mated-connector losses and also locating faults, such as breaks. A number of conventional OTDR's suitable for the inventive aspects of the present disclosure are available from Fiber Instrument Sales, Inc., Tektronix, Inc., and AFL Telecommunications LLC (Noyes Products).

In this type of a configuration, a closed-loop would not be necessary and tamper could be detected by optical pulses sent from either end of the daisy-chain.

Still referring to FIG. 2, the tamper detection device 12 is designed to cause the interruption in the signal to activate an alarm if tamper with the cabinet 10 is detected. As discussed previously, the first and the second connectors 80, 84 are fiber optic connectors and an optical connection is established between the two connectors through the adapter 78. However, this optical connection is only established when the opening 76 of the gate 70 is aligned with the throughhole 90 of the adapter 78 allowing an optical signal to pass between the two connectors. As long as the second magnet 68 of the tamper detection device 12 is kept afloat due to a repelling force by the first magnet 52, the gate 70 stays at the proper height within the device housing 64 and the opening 76 on the gate 70 stays generally aligned with the throughhole 90 of the adapter 78 to provide a pathway for the optical signal.

If the door 18 of the cabinet 10 is opened (for example, without proper authority), as soon as the magnets 52, 68 are moved relative to each other, the floating second magnet 68 is no longer kept afloat by the repelling force of the first magnet 52 and moves toward the bottom 73 of the device housing 64. In this manner, the gate 70 moves downwardly within the device housing 64 and the opening 76 of the gate 70 moves out of alignment with the throughhole 90 of the adapter 78. This breaks the optical connection between the first and the second connectors 80, 84 and the interruption in the optical signal triggers an alarm at a central office location, indicating tampering.

The tamper detection device 12 is preferably located within the interior of the cabinet 10 and is not visible from the outside of the cabinet 10. As shown in FIG. 1, the first magnet 52 of the tamper detection device 12 may be mounted on the door 18 of the cabinet 10 and may move with the door 18. The first device portion 44 of the tamper detection device 12 may be mounted on the frame portion 26 of the housing 16, with the middle device portion 46 freely suspended from the first device portion 44 via the gimbal mount 54.

The tamper detection device 12 may be mounted at different locations around the cabinet 10. For example, as illustrated in FIG. 1, the first device portion 44 may be mounted on the upper frame portion 26 adjacent the upper end 36 of the door 18, wherein the first magnet 52 would be mounted adjacent the upper end 36 of the door 18.

FIG. 3 illustrates an alternative mounting location for the tamper detection device 12 in case there is not enough space on the upper frame portion 26 of the cabinet 10. For example, as shown in FIG. 3, the first device portion 44 can be mounted on the right frame portion 32 wherein the first magnet 52 would be mounted adjacent the right end 40 of the door 18. In the mounting configuration shown in FIG. 3, a support structure 92 such a rod or a bracket may be used to position the device housing 64 above the first magnet 52 when mounting the tamper detection device 12. In the mounting configuration shown in FIG. 3, the device housing 64 hangs down adjacent the right end 40 of the door 18 above the first magnet 52, wherein opening of the door 18 would move the first magnet 52 away from the second magnet 68 and trigger an alarm, as discussed above.

It should be noted that the mounting locations depicted in FIGS. 1 and 3 are only two of the various locations that may be used to mount the tamper detection device 12 on the cabinet 10 and depending on the configuration of the cabinet and the availability of mounting space around the access opening, other mounting locations are certainly possible.

The tamper detection device 12 is configured to detect and warn against possible tamper with the cabinet 10. One form of such tampering may be unauthorized opening of the door 18. Another form of tampering may be to try to stabilize the two magnets 52, 68 of the tamper detection device 12 and maintaining the fiber optic signal before opening the door 18 without authorization. As discussed above, the device housing 64 of the tamper detection device 12 is pivotally connected to the upper device portion 44 of the device 12 and is freely suspended from the upper device portion 44. The suspended orientation of the device housing 64 prevents an unauthorized party from trying to stabilize the device housing 64 from the outside by using for example, a drill or other type of stabilization or clamping device. If an unauthorized party tries to drill a hole through the frame 26 or the door 18 of the cabinet 10, trying to "catch" the device housing 64 and stabilize either the second magnet 68 or the gate structure 70 within the device housing 64 (such that opening 76 stays aligned with the adapter throughhole 90), the unauthorized party will have a difficult time since the device housing 64 will tend to swing freely in all directions away from the drill. Thus, even an attempt at trying to stabilize the middle device portion 46 will trigger an alarm by moving the second magnet 68 away from the first magnet 52, warning of possible tamper with the cabinet 10.

Having described the preferred aspects and embodiments of the present invention, modifications and equivalents of the disclosed concepts may readily occur to one skilled in the art. However, it is intended that such modifications and equivalents be included within the scope of the claims which are appended hereto.

What is claimed is:

1. A cabinet tamper detection device comprising:

a first portion, the first portion including a housing, the first portion including a first magnet movable relative to the housing between a first position and a second position; and a second portion, the second portion including a second magnet, the first and the second magnets configured such that the second magnet is configured to apply a magnetic force on the first magnet to keep the first magnet at the first position relative to the housing when the first and the second magnets are at a predetermined relative position with respect to each other, wherein the cabinet tamper detection device is configured such that when at least one of the first and the second magnets is moved from the predetermined relative position of the first and second magnets, the first magnet moves from the first position to the second position relative to the housing to interrupt a signal, wherein the signal is a fiber optic signal and wherein the first magnet is coupled to a gate structure, the gate structure including an opening for allowing the fiber optic signal to pass therethrough when the first magnet is at the first position and wherein the housing includes an adapter for mating a first fiber optic connector with a second fiber optic connector, wherein the fiber optic signal passing through the opening of the gate is transmitted between the first and the second fiber optic connectors mated through the adapter;

wherein the first portion is configured to be mounted on a cabinet and includes a gimbal mount for freely suspending the housing of the first portion from the cabinet such that the housing can swing freely in a 360 degree orientation.

2. A cabinet tamper detection device according to claim 1, wherein the fiber optic signal is interrupted when the first magnet, by moving to the second position, causes the opening of the gate structure to move relative to the housing.

3. A cabinet tamper detection device according to claim 1, wherein the housing includes a longitudinal axis and the first magnet slidably moves generally along the longitudinal axis.

4. A cabinet tamper detection device according to claim 1, wherein the gimbal mount includes a ball/socket joint.

5. A cabinet tamper detection device according to claim 1, wherein the housing includes a hollow interior and the first magnet moves within the hollow interior.

6. A telecommunications cabinet comprising:

(a) a cabinet housing for housing telecommunications equipment;

(b) a door pivotally disposed to the cabinet housing to cover an access opening to the telecommunications equipment, the door movable between an open position and a closed position; and (c) a tamper detection device including:

(i) a cabinet portion mounted on the cabinet housing, the cabinet portion including a device housing, the cabinet portion also including a first magnet movable relative to the device housing between a signal-on position and a signal-off position, the cabinet portion mounted on the cabinet housing with a gimbal mount for freely suspending the device housing from the cabinet housing such that the device housing can swing freely in a 360 degree orientation; and (ii) a door portion mounted on the door, the door portion including a second magnet, the first and the second magnets configured such that the second magnet applies a magnetic force on the first magnet to keep the first magnet at the signal-on position when the first and the second magnets are at a predetermined relative position with respect to each other, (iii) wherein the cabinet tamper detection device is configured such that when at least one of the first and the second magnets is moved from the predetermined relative position of the first and second magnets, the first magnet moves from the signal-on position to the signal-off position to trigger a warning, wherein the first magnet is coupled to a gate structure, the gate structure including an opening for allowing a fiber optic signal to pass therethrough when the first magnet is at the signal-on position and wherein the device housing includes an adapter for mating a first fiber optic connector with a second fiber optic connector, wherein the fiber optic signal passing through the opening of the gate is transmitted between the first and the second fiber optic connectors mated through the adapter.

7. A telecommunications cabinet according to claim 6, wherein the predetermined relative position of the first and second magnets is established when the door is at a closed position relative to the cabinet housing.

8. A telecommunications cabinet according to claim 6, wherein moving the door from the closed position to the open position moves the first magnet to the signal-off position.

9. A telecommunications cabinet according to claim 6, wherein the cabinet housing includes an interior and the cabinet tamper detection device is mounted within the interior of the cabinet housing and not visible from outside the housing.

10. A telecommunications cabinet according to claim 6, wherein the fiber optic signal is interrupted when the first magnet, by moving to the signal-off position, causes the opening of the gate structure to move relative to the device housing.

11. A telecommunications cabinet according to claim 6, wherein the device housing includes a longitudinal axis and the first magnet slidably moves generally along the longitudinal axis.

12. A telecommunications cabinet according to claim 6, wherein the gimbal mount includes a ball/socket joint.

13. A telecommunications cabinet according to claim 6, wherein the device housing includes a hollow interior and the first magnet moves within the hollow interior.

14. A method of detecting tamper with a cabinet, the method comprising the steps of:

(a) providing a tamper detection device comprising a first portion and a second portion, the first portion including a housing and a first magnet movable relative to the housing between a first position and a second position, the second portion including a second magnet that applies a magnetic force on the first magnet to keep the first magnet at the first position, wherein the first portion is configured to be mounted on a cabinet and includes a gimbal mount for freely suspending the housing of the first portion from the cabinet such that the housing can swing freely in a 360 degree orientation; and (b) moving at least one of the first and the second magnets relative to each other to move the first magnet from the first position to the second position to trigger a warning by interrupting a fiber optic signal, wherein the first magnet is coupled to a gate structure, the gate structure including an opening for allowing the fiber optic signal to pass therethrough when the first magnet is at the first position and wherein the housing includes an adapter for mating a first fiber optic connector with a second fiber optic connector, wherein the fiber optic signal passing through the opening of the gate is transmitted between the first and the second fiber optic connectors mated through the adapter.

15. A cabinet tamper detection device comprising:

a first portion, the first portion including a housing including an interior and defining a longitudinal axis, the first portion including a first magnet slidably movable along the longitudinal axis of the housing within the interior, the first magnet movable relative to the housing between a first vertical position and a second vertical position, the housing including an adapter for mating a first fiber optic connector with a second fiber optic connector such that a fiber optic signal can pass from the first fiber optic connector to the second fiber optic connector; and a second portion, the second portion including a second magnet, the first and the second magnets configured such that the second magnet applies a magnetic force on the first magnet to keep the first magnet at the first vertical position relative to the housing when the first and the second magnets are at a predetermined relative position with respect to each other, the first and the second magnets are mounted such that when the second magnet is moved away from the first magnet, the first magnet moves toward the second vertical position due to gravitational force, wherein the first magnet is coupled to a vertical gate structure defining an opening for allowing the fiber optic signal to pass therethrough when the first magnet is at the first vertical position and wherein when at least one of the first and the second magnets is moved from the predetermined relative position of the first and second magnets, the first magnet moves from the first vertical position to the second vertical position relative to the housing to interrupt the fiber optic signal passing between the first and second fiber optic connectors, wherein the first portion is configured to be mounted on a cabinet and includes a gimbal mount for freely suspending the housing of the first portion from the cabinet such that the housing can swing freely in a 360 degree orientation.

* * * * *